Dec. 13, 1932.    C. B. LIMBRICK    1,890,545
MOISTURE MEASURING DEVICE
Filed Aug. 23, 1930    2 Sheets-Sheet 1
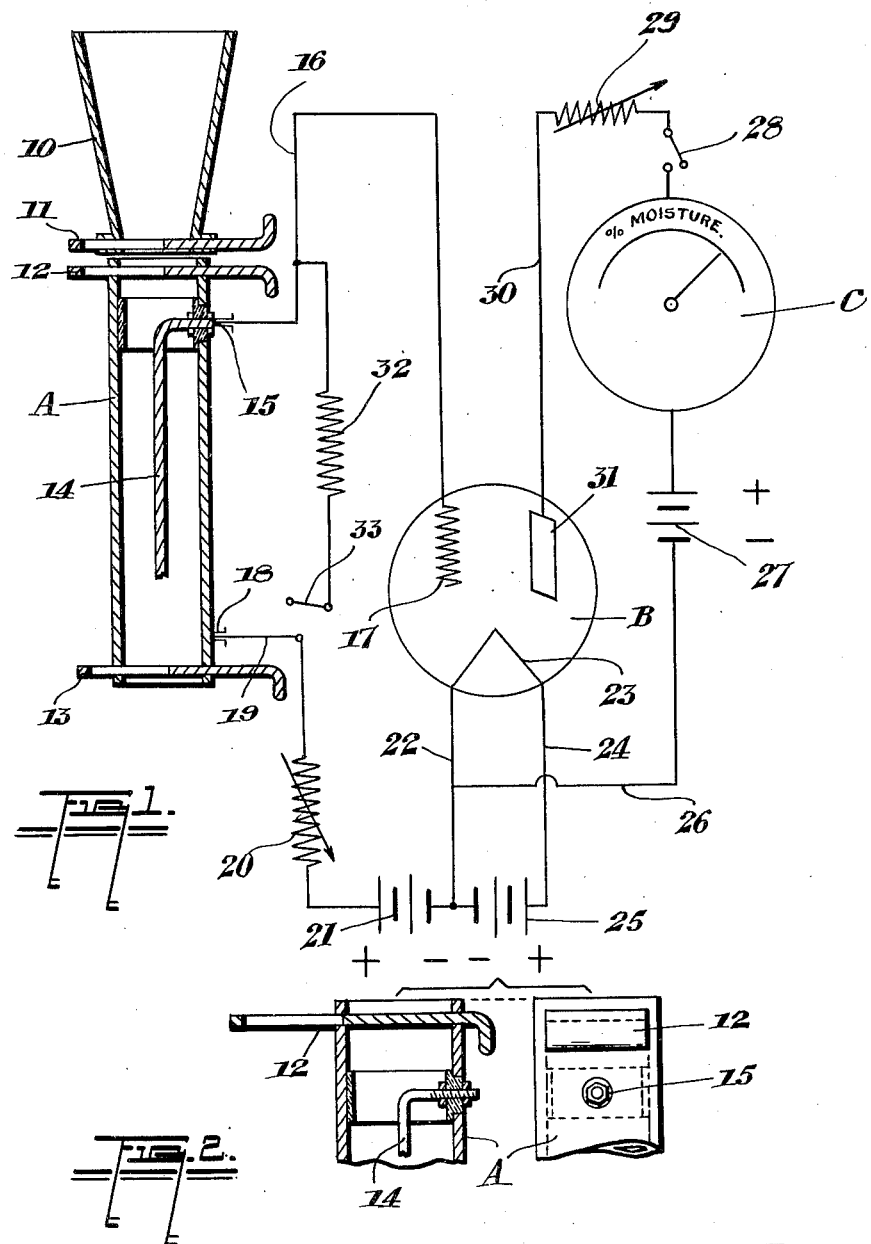
Inventor
Charles B. Limbrick
BY Smart & Biggar
Attys.

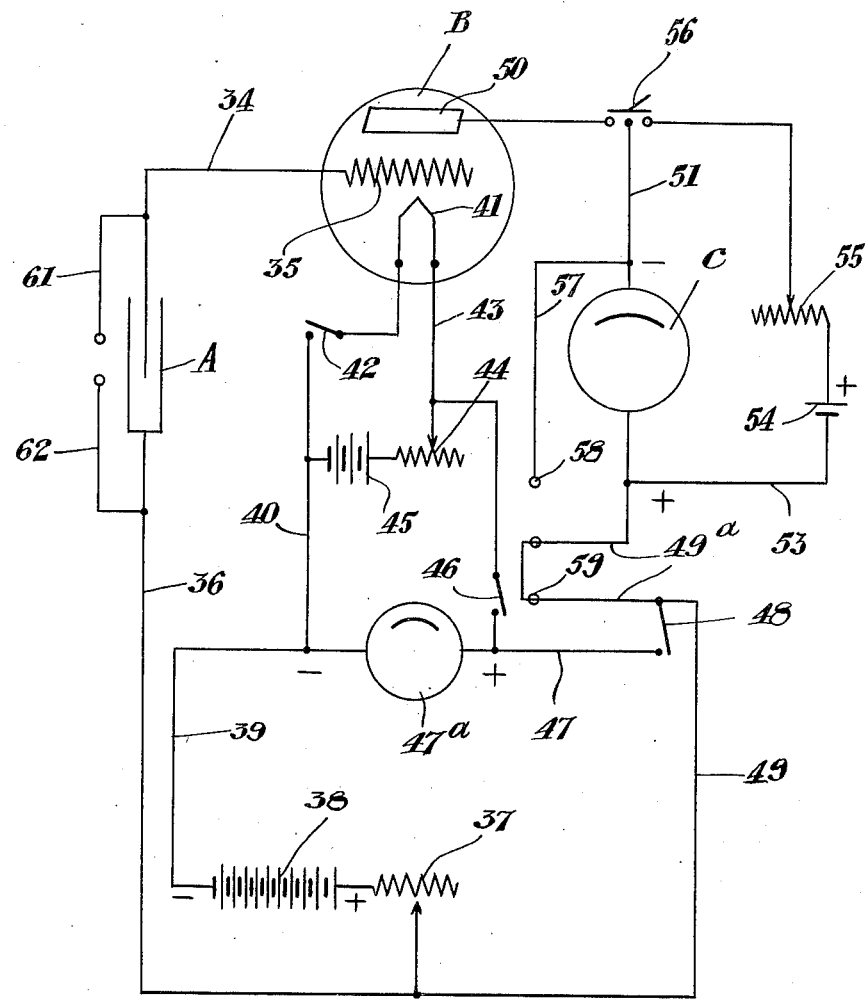

Patented Dec. 13, 1932

1,890,545

UNITED STATES PATENT OFFICE

CHARLES BERNARD LIMBRICK, OF FORT WILLIAM, ONTARIO, CANADA

MOISTURE MEASURING DEVICE

Application filed August 23, 1930, Serial No. 477,352, and in Canada September 9, 1929.

This invention relates to improvements in moisture measuring devices or testers, and an object of the invention is to provide means for measuring the moisture content of different materials, in all cases where the electric conductivity is proportional to the percentage of moisture.

A further object of the invention is to provide a measuring device of this character which may be used to a certain degree in analyzing liquids.

A still further object of the invention is to provide a measuring device simple and efficient in character which may be quickly and continuously operated, contingent upon intervals necessary for changing the material.

With these and other objects in view, the invention consists in an electrically operated measuring device including a receptacle for the material or a device for attachment to the material, incorporated in a non-oscillating circuit including a vacuum tube, adapted to amplify small variations in conductivity, a measuring device for indicating variations and control means for the circuit, as more fully described in the present specification and illustrated in the accompanying drawings.

I am aware that it has been previously proposed to measure the moisture content of grain through the medium of an oscillating circuit arrangement. However, this proposal has a great many disadvantages such as for instance, sensitivity of the circuit, necessity of minute adjustment and the length of time necessary to effect operation. The present invention fully overcomes disadvantages of this character.

In the drawings:

Figure 1 illustrates diagrammatically one form of the circuit arrangement according to the present invention.

Figure 2 is a detail of one form of receptacle which may be employed and which is illustrated in Figure 1, and Figure 3 is a diagrammatic illustration of one circuit arrangement according to the present invention.

Referring to the drawings, and more particularly to Figure 1, A indicates a suitable receptacle for the material to be tested connected in a non-oscillating circuit which includes a vacuum tube B and a measuring instrument such as a microammeter C.

As an illustration of the invention, Figure 1 is described as being applied to the testing of granular material but it will be understood that the receptacle A could be eliminated and any other suitable device could be used which would lend itself more readily to the character of the material which was desired to test.

The receptacle A includes a hopper 10, slides 11 and 12 for retaining the grain in the hopper and subsequently admitting the grain to the receptacle A, with the provision of a slide 13 in the bottom of the receptacle to discharge the grain after testing. An electrode 14 is designed to extend into the receptacle and suitably insulated from the walls thereof which form the opposite electrode. The electrode 14 is connected in any suitable manner such as through contact clip 15 with lead 16 which connects with the grid 17 of the vacuum tube B. The receptacle walls through a suitable clip 18 or the like are connected with the lead 19 through the variable resistor 20 with the bias battery 21 and through the lead 22 with the filament 23 of the vacuum tube B, the filament circuit including the lead 24 and filament battery 25. A further lead 26 connects with the lead 22 and through the plate battery 27 connects with the measuring instrument C which is incorporated in the plate circuit of the vacuum tube B, the circuit being completed through the switch 28 variable resistance 29 and lead 30 to the plate 31.

Between the lead 16 and lead 19 resistance 32 controlled by switch 33 is positioned which is shunted across said leads in the preliminary operation of the circuit.

In operation the voltages of the batteries 21, 25 and 27 are adjusted to meet the requirements of the operating characteristics of the vacuum tube. Switch 28 is closed and upon closure of the switch 33 resistance 20 may be varied until a predetermined reading is obtained on meter C, said reading being equal to that obtained with a standard sample of grain. Switch 28 is then opened and the sample to be tested is placed in the hopper 10, slides 11 and 13 are closed and slide 12 is opened. Slide 11 is then opened allowing the grain to discharge into the receptacle A. Slide 12 is then closed, cutting off the grain evenly. When the sample has been properly placed in the container, switch 28 is closed and the grid circuit is completed through the material in the receptacle A. According to the moisture content in the material a varying positive bias is produced on the grid 17 and through the plate circuit in normal operation of the tube. A greater flow of current in the grid naturally causes a greater flow of current in the plate circuit and the moisture content is reflected in the measuring instrument C, and compared with standard.

The illustration in Figure 3 employs the same principle, the only difference being that the circuit arrangement is changed.

In the case of Figure 3 the receptacle A is connected through the lead 34 with the grid 35 of the vacuum tube B, the grid circuit being completed through the lead 36 through variable resistance 37, plate battery 38 and leads 39 and 40. filament 41, a switch 42 being included in the lead 40. A return lead 43 from the filament 41 includes the variable resistance 44 and filament battery 45 connected across to the lead 40 in the filament circuit. The lead 43 connects through switch 46 with a lead 47 to voltmeter 47a which is connected across leads 40 and 43 by the lead 47. Through the medium of the switch 48. lead 49 and resistance 37, the voltmeter is placed in circuit with the plate battery 38 so that on proper manipulation of the switches 46 and 48 the voltage of the filament battery and plate battery may be ascertained.

A continuation 49a of lead 49 connects with the measuring device C and the plate circuit is completed through lead 51 to plate 50.

A conductor or lead 53 connects with the lead 49a on one side of the measuring instrument and through the low voltage battery 54 and variable resistance 55 terminates with one of the points of the three-point contact switch 56, the other points of this switch being connected through the lead 51 in the plate circuit. On the opposite side of the measuring instrument C a by-passing lead 57 is taken from the lead 51 terminating in the binding post or the like 58 and through this medium any other suitable instrument may be connected in the plate circuit by eliminating lead 49a and connecting with the terminal 59.

Similar to the lead 57, leads 61 and 62 are connected in the circuit on each side of the receptacle A and these leads terminate in binding posts or the like so that any other suitable device may be employed, depending upon the character of the material being tested. As an example, if it was desired to test the moisture content of wood, a suitable device with platinum contacts could be connected to the leads 61 and 62 and inserted in the wood.

In operation, the voltage of the batteries 38 and 45 are first adjusted to meet the operating requirements by first closing switch 42 and switch 46 in the case of the filament battery and adjusting the variable resistance 44 until a correct reading is obtained on the volt meter 47a. In the case of the plate battery, switches 42 and 48 are closed, switch 46 remaining open and similarly through the variable resistance 37 the voltage is adjusted, the reading being taken on the meter 47a. When the voltages have been adjusted, switches 46 and 48 are opened.

Before testing a sample, as in the case of the first illustration of my invention, the switches 42 and 56 are closed and any deflection of the needle is corrected through the variable resistance 55. A resistance may be placed across the lead 61 and 62 and a predetermined reading may be obtained on the measuring device C corresponding to a standard sample of grain by variation of the resistance 37. The general operation is then proceeded with similarly to that as described in the form illustrated in Figure 1, the voltage being checked from time to time through the volt meter 47a, and the initial reading on the measuring device C being recalibrated in like manner for the sake of accuracy.

Due to the compactness of the circuit illustrated in Figure 3, it will be seen that it is a very simple matter to re-check the voltages through the meter 47a to see that tests are being carried out under proper conditions.

The tests can be carried on continuously with the exception of the time taken for changing the testing material and it will be realized that a quite accurate measurement is assured. In practice, the average of the second and third tests should be taken.

Various modifications may be made in this invention without departing from the spirit thereof or the scope of the claim, and therefore the exact forms shown are to be taken as illustrative only and not in a limiting sense, and it is desired that only such limitations shall be placed thereon as are disclosed in the prior art or are set forth in the accompanying claim.

What I claim as my invention is:

A device for measuring the moisture content of materials through their electrical conductivity, comprising in combination a three-electrode vacuum tube having plate, grid and filament electrodes, a receptacle for the material to be tested, including a hopper having controlling slides at the top and bottom thereof, an electrode extending into the receptacle and suitably insulated from the walls thereof, the said electrode and the receptacle being included in the grid circuit, a battery in the plate circuit, a battery in the grid circuit connected to place a positive bias on the grid, a filament battery, an indicating instrument in the plate circuit and variable resistances in the plate and grid circuits.

In witness whereof I have hereunto set my hand.

CHARLES BERNARD LIMBRICK.